United States Patent [19]

Shimura

[11] Patent Number: 5,060,081

[45] Date of Patent: Oct. 22, 1991

[54] METHOD OF ADJUSTING READ-OUT CONDITION AND/OR IMAGE PROCESSING CONDITION FOR RADIATION IMAGE

[75] Inventor: Kazuo Shimura, Kanagawa, Japan

[73] Assignee: Fuji Photo Film Co., Ltd., Kanagawa, Japan

[21] Appl. No.: 325,176

[22] Filed: Mar. 17, 1989

[30] Foreign Application Priority Data

Mar. 19, 1988 [JP] Japan ............................ 63-66747
Aug. 1, 1988 [JP] Japan ............................ 63-192373

[51] Int. Cl.$^5$ .................................... H04N 1/40
[52] U.S. Cl. .................................... 358/443; 382/51; 358/110; 250/327.2
[58] Field of Search ............... 250/327.2 R, 327.2 A, 250/327.2 B, 327.2 C, 327.2 D, 327.2 E, 327.2 F, 327.2 G, 327.2 H, 327.2 J, 327.2 K, 327.2 L, 459.1, 484.1 R, 484.1 B; 358/400, 401, 406, 443, 445, 447, 448, 455, 456, 458, 464, 471, 472, 474, 475, 480, 481, 494, 496, 497, 199, 201, 206, 296, 302, 110; 382/49, 50, 51

[56] References Cited

U.S. PATENT DOCUMENTS

| | | | |
|---|---|---|---|
| 4,258,264 | 3/1981 | Kotera et al. | 358/489 |
| 4,276,473 | 6/1981 | Kato et al. | 250/327.2 G |
| 4,302,672 | 11/1981 | Kato et al. | 250/327.2 G |
| 4,315,318 | 2/1982 | Kato et al. | 358/447 |
| 4,387,428 | 6/1983 | Ishida et al. | 250/337 |
| 4,527,060 | 7/1985 | Suzuki et al. | 250/327.2 |
| 4,629,891 | 12/1986 | Nakajima et al. | 250/327.2 |
| 4,652,999 | 3/1987 | Higashi et al. | 250/327.2 G |
| 4,682,028 | 7/1987 | Tanaka et al. | 250/327.2 G |
| 4,804,842 | 2/1989 | Nakajima | 250/327.2 G |
| 4,859,850 | 8/1989 | Funahashi et al. | 250/327.2 G |

Primary Examiner—Edward L. Coles, Sr.
Assistant Examiner—Jerome Grant, II
Attorney, Agent, or Firm—Sughrue, Mion, Zinn Macpeak & Seas

[57] ABSTRACT

A method of adjusting a read-out condition and/or an image processing condition for a radiation image comprises the steps of carrying out preliminary read out prior to carrying out final read out for obtaining an image signal which represents a radiation image stored on a stimulable phosphor sheet and which is to be used for reproducing a visible radiation image, and creating a histogram of a preliminary read-out image signal obtained by the preliminary read out. An image information range, which is necessary for reproducing the visible radiation image, is determined from the histogram. A read-out condition and/or an image processing condition is adjusted in accordance with a latitude of the image information range so that a latitude of the reproduced visible image is changed so as to widen nonlinearly when the latitude of the image information range widens.

9 Claims, 5 Drawing Sheets

METHOD OF ADJUSTING READ-OUT CONDITION AND/OR IMAGE PROCESSING CONDITION FOR RADIATION IMAGE

BACKGROUND OF THE INVENTION

1. Field of the Invention

This invention relates to a radiation image read-out and reproducing system for obtaining an image signal by reading out a radiation image from a recording medium, such as a stimulable phosphor sheet, on which the radiation image of an object has been recorded, carrying out image processing of the image signal, and reproducing a visible image by using the processed image signal. This invention particularly relates to a method of adjusting a radiation image read-out condition to be used for image read out and/or a radiation image processing condition to be used for image processing of the image signal.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value designed so as to match the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, and by using the image signal the radiation image of the object is reproduced as a visible image on a recording material such as a photographic film, a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted upon stimulation after the radiation energy is stored on the stimulable phosphor varies over a wide range and is proportional to the amount of energy stored during exposure to the radiation, it is possible to obtain an image having a desirable density regardless of the energy intensity of the radiation to which the stimulable phosphor sheet was exposed, by setting an appropriate read-out gain when detecting the emitted light and converting it into an electric signal to be used in reproducing a visible image on a recording material or a display device.

In order to detect an image signal with an appropriate read-out condition in accordance with a radiation dose to a stimulable phosphor sheet and the like, it has been proposed to constitute a radiation image recording and reproducing system such that preliminary read out is carried out for approximately ascertaining the radiation image stored on the stimulable phosphor sheet by scanning the stimulable phosphor sheet with a light beam of a comparatively low level of energy, and a preliminary read-out image signal obtained by the preliminary read out is analyzed. Thereafter, final read out is carried out for obtaining the image signal, which is to be used for reproducing a visible image, by scanning the stimulable phosphor sheet with a light beam having a higher level of energy than the level of energy of the light beam used in the preliminary read out, and reading out the radiation image with a read-out condition adjusted to an appropriate value on the basis of results of analysis of the preliminary read-out image signal.

The term "read-out condition" as used herein means generically various conditions affecting the relationship between the amount of light emitted by the stimulable phosphor sheet during image read out and the output of a read-out means. For example, the term "read-out condition" means a read-out gain and a scale factor which define the relationship between the input to the read-out means and the output therefrom, or the power of stimulating rays used for image read out.

The term "level of energy of a light beam" as used herein means the level of energy of the light beam to which the stimulable phosphor sheet is exposed per unit area. In cases where the energy of light emitted by the stimulable phosphor sheet depends on the wavelength of the light beam, i.e. has a distribution of sensitivity to the wavelength, the term "energy level of a light beam" means the weighted energy level which is calculated by weighting the level of energy of the light beam, to which the stimulable phosphor sheet is exposed per unit area, with the sensitivity to the wavelength. In order to change the level of the light beam, light beams of different wavelengths may be used, the intensity of a light beam produced by a laser beam source or the like may be changed, or the intensity of a light beam may be changed by moving a ND filter or the like into and out of the optical path of the light beam. Alternatively, the density of scanning may be changed by changing the diameter of a light beam, or the speed of scanning with a light beam may be changed.

Regardless of whether the preliminary read out is or is not carried out, it has also been proposed to analyze the image signal (including the preliminary read-out image signal) obtained and to adjust an image processing condition appropriately for use in image processing of the image signal on the basis of results of analysis of the image signal. The proposed method is applicable to the cases where an image signal is obtained from a radiation image recorded on a recording medium such as a conventional X-ray film, as well as to the system using the stimulable phosphor sheet.

One of the conditions which should be considered when adjusting a read-out condition and/or an image processing condition is to remove signal components which represent unnecessary image portions recorded on a recording medium, for example, an image portion upon which only scattered radiation impinged, and an image portion upon which radiation impinged directly without being passed through or reflected by an object. In this manner, it is necessary to adjust a read-out condition and/or an image processing condition so that only the portion which is to be viewed is reproduced with an appropriate image density when a visible image is ultimately reproduced on a photographic material or the like.

As an example of the methods described above, a method of adjusting a read-out condition disclosed in U.S. Pat. No. 4,527,060 will be described hereinbelow with reference to FIG. 1A. FIG. 1A is a graph showing a histogram of a preliminary read-out image signal SP. The disclosed method is used in a system wherein a stimulable phosphor sheet is utilized and preliminary read-out is carried out.

With reference to FIG. 1A, values of the preliminary read-out image signal SP, which is obtained by detecting light emitted by a stimulable phosphor sheet during preliminary read-out and which is proportional to the amount of the emitted light, are plotted on the horizontal axis (logarithmic axis). The frequency of occurrence of the values of the preliminary read-out image signal SP is plotted on the vertical axis at the upper part of the graph. Also, values of an image signal SQ obtained during final read-out are plotted on the vertical axis at the lower part of the graph (logarithmic axis). In this case, the histogram of the preliminary read-out image signal SP is composed of projecting portions A, B and C, and it is assumed that the projecting portion B corresponds to the portion necessary as a visible image reproduced ultimately. By way of example, in order to find out the projecting portion B, the histogram is searched by using a predetermined threshold value T from the position of the minimum value SL of the preliminary read-out image signal SP along the direction of increase of the image signal values, i.e. along the chained line. In this manner, a second rising point "a" and the next falling point "b" are found. The range sandwiched between the points "a" and "b" is found as the image information range which is to be reproduced into a visible image. The minimum value and the maximum value of the preliminary read-out image signal SP in the found image information range are denoted by Smin (which corresponds to the point "a") and Smax (which corresponds to the point "b") respectively. The disclosed method of adjusting a read-out condition adjusts the read-out condition for the final read-out so that Smin and Smax are detected respectively as the minimum image signal value Qmin and the maximum image signal value Qmax in the final read-out. The minimum image signal value Qmin and the maximum image signal value Qmax in turn correspond respectively to the minimum density Dmin and the maximum density Dmax within a correct image density range in the visible image ultimately reproduced on a photographic material (hereinafter referred to as a recording sheet). (Said minimum density Dmin and said maximum density Dmax will hereinbelow be referred to as the minimum density Dmin and the maximum density Dmax on a recording sheet.) More specifically, the read-out condition for the final read-out is adjusted so that the image information falling within the range from Smin to Smax is detected as values lying on the straight line G1 shown in FIG. 1A.

When the read-out condition for the final read-out is adjusted in the manner described above, the necessary image information alone can be detected with best resolution.

Also, in a system wherein no preliminary read out is carried out, the same thing as described above is carried out in the course of image processing. Specifically, it is considered that an image signal represented by the same histogram as the preliminary read-out image signal SP shown in FIG. 1A is obtained in an image read-out step which corresponds to the final read out in the system wherein preliminary read out is carried out. In this case, the image signal ranging from SL and SH shown in FIG. 1A is detected in the image read-out step. Thereafter, image processing is carried out so that the range which is sandwiched between Smin and Smax shown in FIG. 1A and which is to be reproduced into a visible image corresponds to the range sandwiched between the minimum density Dmin and the maximum density Dmax on a recording sheet.

As described above, a read-out condition and/or an image processing condition is adjusted so that the range sandwiched between the minimum value (i.e. Smin in preliminary read out, or Qmin in final read out shown in FIG. 1A) and the maximum value (i.e. Smax in preliminary read out, or Qmax in final read out shown in FIG. 1A) of the image signal necessary for reproducing a visible image corresponds to the whole range sandwiched between the minimum density Dmin and the maximum density Dmax on a recording sheet. As a result, a visible image with best density resolution can be reproduced by taking full advantage of the performance of the recording sheet.

However, in cases where the object is a periphery of a limb of the human body or is an infant by way of example, the range of the image signal necessary for reproducing a visible image is very narrow. (That is, the difference between the maximum density and the minimum density at a necessary portion of the object is small when the radiation image of the object is reproduced into a visible image.) When the visible image is reproduced so that the performance of a recording sheet is utilized to the fullest, a visible image having very high contrast and unsuitable for viewing purposes is obtained.

Furthermore, X-ray images recorded on X-ray films have approximately constant contrast regardless of the type of the object. Therefore, an observer who is experienced in viewing X-ray images having approximately constant contrast cannot readily adapt himself to an image having high contrast.

SUMMARY OF THE INVENTION

The primary object of the present invention is to provide a method of adjusting a read-out condition and/or an image processing condition for a radiation image, which enables obtaining a visible reproduced image having appropriate contrast regardless of the type of an object.

Another object of the present invention is to provide a method of adjusting a read-out condition and/or an image processing condition for a radiation image, which enables obtaining a visible reproduced image suitable for viewing, particularly for diagnostic purposes.

A method of adjusting a read-out condition and/or an image processing condition for a radiation image in accordance with the present invention utilizes a preliminary read-out image signal obtained by preliminary read out. Specifically, the present invention provides, in a radiation image read-out and reproducing system for scanning a stimulable phosphor sheet, on which a radiation image of an object has been stored, with a light beam which causes the stimulable phosphor sheet to emit light in proportion to the amount of energy stored during exposure to radiation, photoelectrically detecting the emitted light by using a read-out condition, thereby to obtain an image signal, carrying out image processing of the image signal by using an image processing condition, and reproducing a visible image from the processed image signal, a method of adjusting a read-out condition and/or an image processing condition for a radiation image, which comprises the steps of:

i) carrying out preliminary read out for approximately ascertaining the radiation image, which is stored on the stimulable phosphor sheet, by scanning the stimulable phosphor sheet with a light beam having a lower level of energy than the level of energy of the light beam used in final read out prior to carrying out the final read out for obtaining said image signal by detecting said emitted light, ii) creating a histogram of a preliminary read-out image signal obtained by the preliminary read out, iii) determining an image information range, which is necessary for reproducing said visible image, from said histogram, and iv) adjusting the read-out condition and/or the image processing condition in accordance with a latitude of said image information range so that a latitude of said reproduced visible image is changed so as to widen nonlinearly when the latitude of said image information range widens.

In the method of adjusting a read-out condition and/or an image processing condition for a radiation image in accordance with the present invention, the latitude of the reproduced visible image may be changed so that it is kept constant partially and is widened nonlinearly as a whole when the latitude of the image information range widens.

The present invention is also applicable to a system wherein no preliminary read out is carried out. In this case, only the image processing condition to be used in image processing of an image signal is adjusted. Specifically, the present invention also provides, in a radiation image read-out and reproducing system for obtaining an image signal by reading out a radiation image from a recording medium, on which the radiation image of an object has been recorded, carrying out image processing of the image signal by using an image processing condition, and reproducing a visible image from the processed image signal, a method of adjusting an image processing condition for a radiation image, which comprises the steps of:

i) creating a histogram of said image signal, ii) determining an image information range, which is necessary for reproducing said visible image, from said histogram, and iii) adjusting the image processing condition in accordance with a latitude of said image information range so that a latitude of said reproduced visible image is changed so as to widen nonlinearly when the latitude of said image information range widens.

In the method of adjusting an image processing condition for a radiation image in accordance with the present invention, the latitude of the reproduced visible image may be changed so that it is kept constant partially and is widened nonlinearly as a whole when the latitude of the image information range widens.

The term "creating a histogram of a preliminary read-out image signal" or the term "creating a histogram of an image signal" as used herein means creating, from the image signal (including the preliminary read-out image signal), a histogram of the amounts corresponding to density values at picture elements of the radiation image which is represented by the image signal, for example, a histogram of the amounts of light emitted by the stimulable phosphor sheet on which the radiation image has been stored.

The term "latitude of an image information range necessary for reproducing a visible image" as used herein means, for example, in the case of preliminary read out, the difference between logarithmic values of the minimum value Smin and the maximum value Smax in the image signal range which is necessary for reproducing a visible image and which is shown in FIG. 1A. Said difference is expressed as $$\Delta S = \log S_{max} - \log S_{min}$$

The term "latitude of a reproduced visible image" as used herein means, for example, in the case of preliminary read out, the different between the logarithmic value of the image signal value SL', which corresponds to the minimum density Dmin on the recording sheet, and the logarithmic value of the image signal value SH', which corresponds to the maximum density Dmax on the recording sheet, when a visible image is reproduced on the recording sheet. Said difference is expressed as $$\Delta L = \log S_H' - \log S_L'$$

In a preferred embodiment of the system wherein no preliminary read out is carried out, an image signal is obtained by photoelectrically detecting light which is emitted by a recording medium and which represents a radiation image. The term "light which is emitted by a recording medium and which represents a radiation image" as used herein embraces light emitted by a stimulable phosphor sheet when it is exposed to a light beam (i.e. stimulating rays), light which has passed through a photographic film, and light reflected by a photographic film.

With conventional techniques, the latitude $\Delta L$ of a reproduced visible image is set to be equal to the latitude $\Delta S$ of the image information range necessary for reproducing the visible image (i.e. $\Delta L = \Delta S$). Therefore, when the latitude $\Delta S$ of the image information range is narrow, a visible image is reproduced so that the image information in the narrow latitude $\Delta S$ is distributed over the whole density range sandwiched between the minimum density Dmin and the maximum density Dmax on a recording sheet. As a result, a visible image having very high contrast is obtained.

However, with the method of adjusting a read-out condition and/or an image processing condition for a radiation image in accordance with the present invention, a histogram of an image signal (including a preliminary read-out image signal) which represents a radiation image is created. In accordance with the latitude ΔS of an image information range which is necessary for reproducing a visible image and which is determined from the histogram, a read-out condition and/or an image processing condition is adjusted so that the latitude ΔL of the reproduced visible image is changed so as to widen nonlinearly when the latitude ΔS of the image information range widens. Therefore, when the range of the image signal necessary for reproducing a visible image is very narrow (i.e. when the latitude ΔS of the image information range is very narrow, a visible image can be reproduced so that the image information in the narrow latitude ΔS is distributed over only part of the density range sandwiched between the minimum density Dmin and the maximum density Dmax on a recording sheet. Accordingly, it is possible to prevent the visible image from having very high contrast, and to obtain visible images having appropriate contrast regardless of the type of the object.

DESCRIPTION OF THE PREFERRED EMBODIMENTS

The present invention will hereinbelow be described in further detail with reference to the accompanying drawings.

Figure 3:
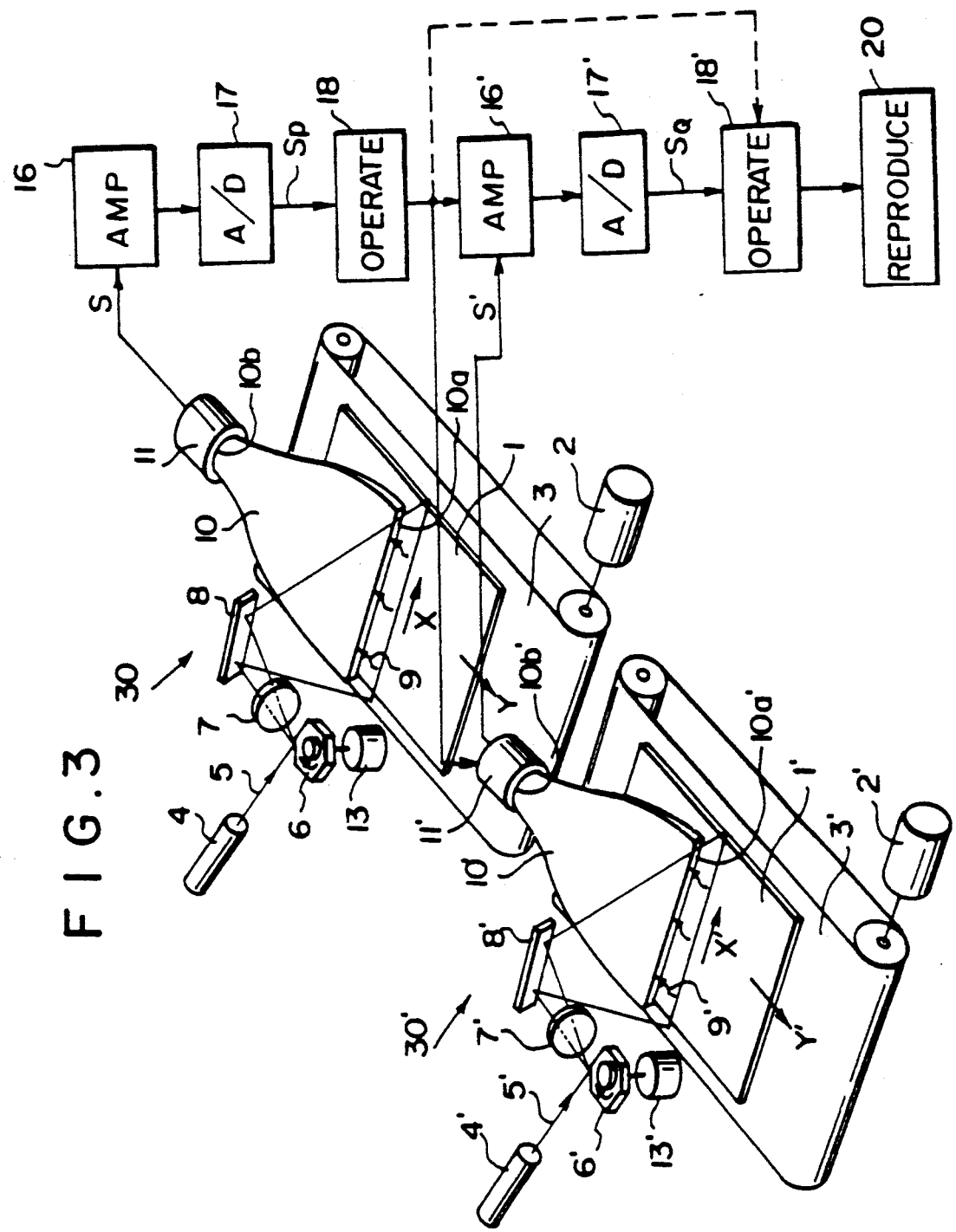
FIG. 3 is a schematic view showing an example of the radiation image read-out and reproducing system wherein an embodiment of the method of adjusting a read-out condition and/or an image processing condition for a radiation image in accordance with the present invention is employed.

With reference to FIG. 3, an example of the radiation image read-out and reproducing system, wherein an embodiment of the method of adjusting a read-out condition and/or an image processing condition for a radiation image in accordance with the present invention is employed, utilizes a stimulable phosphor sheet and carries out preliminary read-out.

A stimulable phosphor sheet 1 on which a radiation image has been stored is placed at a predetermined position in a preliminary read-out section 30 for carrying out preliminary read-out by scanning the stimulable phosphor sheet 1 with a light beam having a low level of energy, and releasing only part of the energy, which has been stored during exposure to radiation, from the stimulable phosphor sheet 1. The stimulable phosphor sheet 1 is conveyed in a sub-scanning direction indicated by the arrow Y by a sheet conveyance means 3 which is constituted of an endless belt or the like and which is operated by a motor 2. On the other hand, a laser beam 5 which has a low level of energy and which is produced by a laser beam source 4 is reflected and deflected by a rotating polygon mirror 6 which is being quickly rotated by a motor 13 in the direction indicated by the arrow, and passes through a converging lens 7 constituted of an fθ lens or the like. The direction of the optical path of the laser beam 5 is then changed by a mirror 8, and the laser beam 5 is caused to impinge upon the stimulable phosphor sheet 1 and scan it in a main scanning direction which is indicated by the arrow X and which is approximately normal to the sub-scanning direction indicated by the arrow Y. When the stimulable phosphor sheet 1 is exposed to the laser beam 5, the exposed portion of the stimulable phosphor sheet 1 emits light 9 in an optical amount proportional to the amount of energy stored during exposure to radiation. The emitted light 9 is guided by a light guide member 10, and photoelectrically detected by a photomultiplier 11 which acts as a photodetector. The light guide member 10 is made by forming a light guiding material such as an acrylic plate, and has a linear light input face 10a extending along the main scanning line on the stimulable phosphor sheet 1, and a ring-shaped light output face 10b in close contact with a light receiving face of the photomultiplier 11. The emitted light 9 which has entered the light guide member 10 from its light input face 10a is guided through repeated total reflection inside of the light guide member 10, emanates from the light output face 10b, and is received by the photomultiplier 11. In this manner, the amount of the emitted light 9 carrying the radiation image is converted into an electric signal by the photomultiplier 11.

An analog output signal S generated by the photomultiplier 11 is amplified by an amplifier 16, and digitized by an A/D converter 17 into a preliminary read-out image signal SP.

In the preliminary read-out, a read-out condition such as the value of voltage applied to the photomultiplier 11 or an amplification degree of the amplifier 16 is adjusted so that image information can be detected over a wide range of energy stored on the stimulable phosphor sheet 1.

The preliminary read-out image signal SP obtained in the manner described above is fed into an operating section 18, which adjusts a read-out condition for final read out, which will be described later, on the basis of the preliminary read-out image signal SP.

The method of adjusting the read-out condition for final read out will be described hereinbelow with reference to FIGS. 1A through 1D, and FIGS. 2A through 2D.

In each of FIGS. 1A through 1D, values of the preliminary read-out image signal SP, which has been obtained by detecting light 9 emitted by the stimulable phosphor sheet 1 shown in FIG. 3 during preliminary read-out and which is proportional to the amount of the emitted light, are plotted on the horizontal axis (logarithmic axis). The frequency of occurrence of the values of the preliminary read-out image signal SP is plotted on the vertical axis at the upper part of the graph. Also, values of an image signal SQ obtained during final read-out are plotted on the vertical axis at the lower part of the graph (logarithmic axis). In each of the histograms shown in FIGS. 1A through 1D, a projecting portion B represents the components of the preliminary read-out image signal SP which have been detected from a portion of the stimulable phosphor sheet 1 at which the radiation image of the object was stored. Projecting portions A and C represent the components of the preliminary read-out image signal SP detected from a portion of the stimulable phosphor sheet 1 upon which only scattered radiation impinged, and a portion of the stimulable phosphor sheet 1 upon which the radiation directly impinged without passing through by the object or without being reflected thereby. The signal components corresponding to the projecting portions A and C need not be detected in final read out. The width of the preliminary read-out image signal SP corresponding to the projecting portion B (i.e. the range sandwiched between the points "a" and "b") becomes wider in the order of FIG. 1A, FIG. 1B, FIG. 1C and FIG. 1D.

After each histogram is created, the image information range which corresponds to the projecting portion B and which is to be detected in final read out is determined from the histogram. Various methods may be used for determining the image information range, depending on the type of the object, such as the chest or the abdomen of the human body. An example of the methods will be described hereinbelow.

The histogram is searched by using a predetermined threshold value T from the position of the minimum value SL of the preliminary read-out image signal SP along the direction of increase of the image signal values, i.e. along the chained line. In this manner, a second rising point "a" and the next falling point "b" are found. The range sandwiched between the points "a" and "b" is found as the image information range necessary for reproducing a visible image. In this example, the minimum value and the maximum value of the preliminary read-out image signal SP in the found image information range are denoted by Smin and Smax and the latitude $\Delta S$ of the image information range is expressed as $$\Delta S = \log Smax - \log Smin$$

A read-out condition for final read out has heretofore been adjusted so that the latitude $\Delta L$ of a reproduced visible image, which latitude corresponds to the range between the minimum density Dmin and the maximum density Dmax on a recording sheet, is equal to the latitude $\Delta S$ of the image information range necessary for reproducing the visible image. (Specifically, the read-out condition for the final read-out has heretofore been adjusted so that the image information falling within the range from Smin to Smax is detected as values lying on the straight lines G1 through G4 shown in FIGS. 1A through 1D. The adjustment corresponds to FIG. 2A.) With such conventional techniques, when the latitude $\Delta S$ of the image information range is very narrow as shown in, for example, FIG. 1A, a visible image having very high contrast is obtained when the radiation image is reproduced into the visible image on a recording sheet.

In the embodiment of the present invention, in order to eliminate the aforesaid problems of the conventional techniques, the read-out condition for the final read out is adjusted by using the algorithm described below.

Figure 1A:
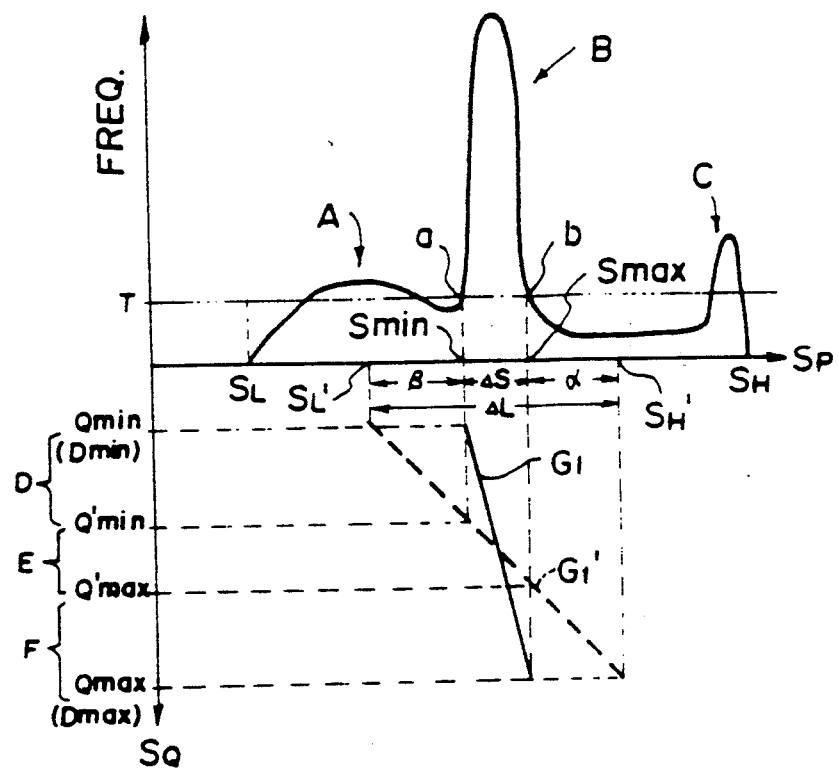
FIGS. 1A, 1B, 1C and 1D are graphs showing examples of histograms of preliminary read-out image signals.
Figure 1B:
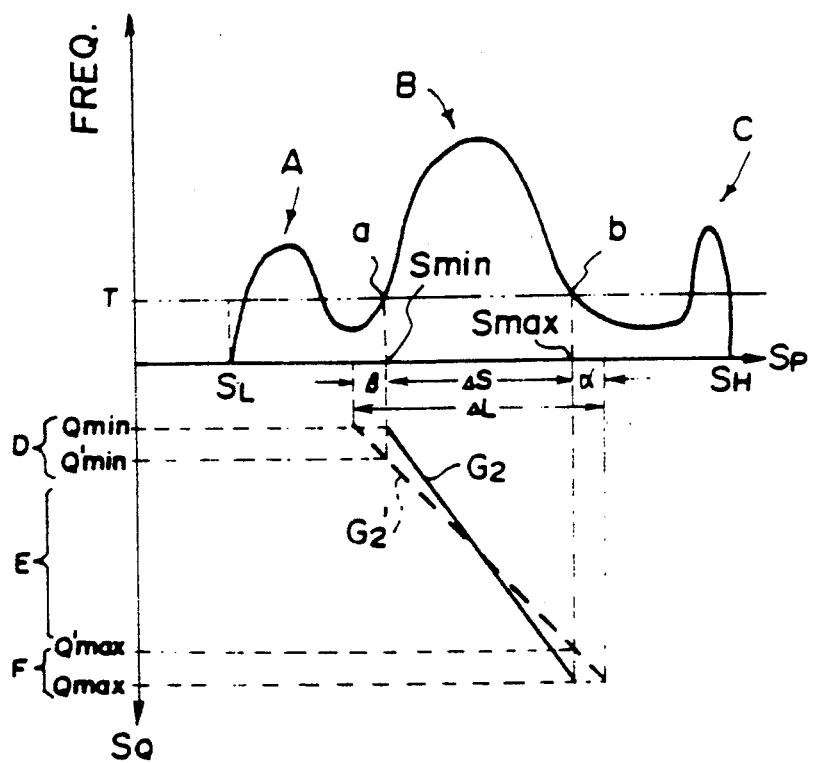

First, the latitude $\Delta S$ of the image information range calculated in the manner described above is compared with a threshold value $\Delta SSH$. In cases where $$\Delta S < \Delta S_{SH}$$

the read-out condition for the final read out is adjusted so that, as shown in FIGS. 1A and 1B, the image information falling within the range which is defined by image signal values SL' and SH' and which is wider than the image information range, is detected in the final read out. Specifically, in FIGS. 1A and 1B, $\alpha$ and $\beta$ are determined so that $$\Delta S_{SH} = \beta + \Delta + \alpha$$

Thereafter, the read-out condition for the final read out is adjusted so that $$\Delta L = \Delta S_{SH}$$

i.e. so that the image information falling within the range which is defined by image signal values SL' and SH' is detected as values lying on the straight line G1' or G2' shown in FIG. 1A or 1B.

When the read-out condition for the final read out is adjusted in the manner described above, regions D and F of unnecessary image signal components shown in FIG. 1A or 1B are included in the range falling between the minimum image signal value Qmin and the maximum image signal value Qmax of the image signal SQ detected by the final read out. However, the process described above means that the read-out condition for the final read out, such as the amplification degree of a photomultiplier 11' or an amplifier 16' described later, is determined so as to follow the straight line G1' or G2'. Actually, only the image signal components falling within the range, which is sandwiched between Q'min and Q'max and which is necessary for reproducing a visible image, are sampled and detected by an A/D converter 17'. Alternatively, the image signal components falling within the range sandwiched by Qmin and Qmax may be detected, and only the image signal components falling within the range sandwiched between Q'min and Q'max may be taken up during the image processing step.

Figure 1C:
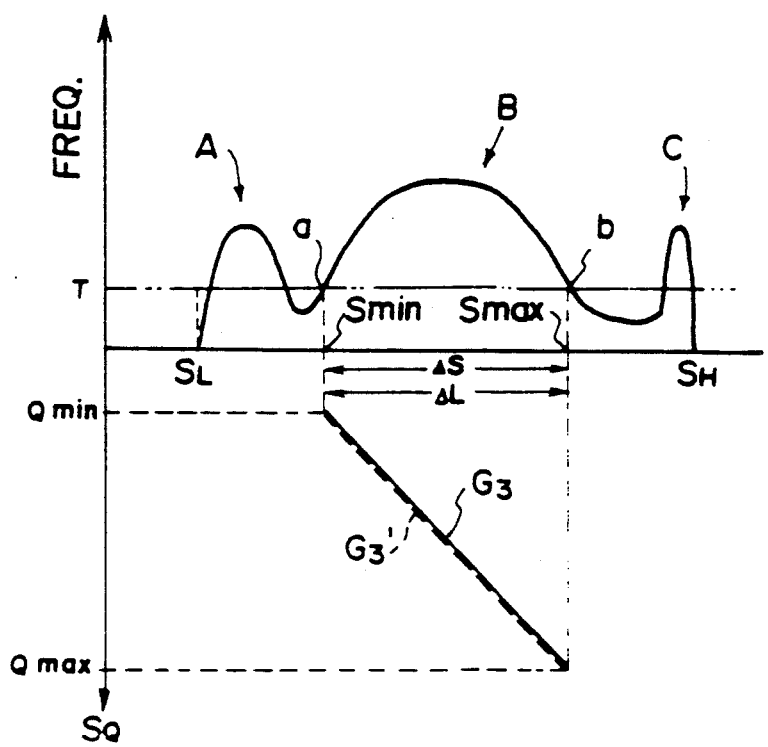

FIG. 1C shows the case where the image information range corresponding to the projecting portion B is wider than in FIGS. 1A and 1B, and $\Delta S = \Delta SSH$. In this case, $\alpha$ and $\beta$ are equal to zero. Therefore, the formula expressed as $$\Delta L = \Delta S_{SH} = \Delta S$$

obtains, and the image information falling within the range of the latitude $\Delta S$ is distributed over the whole range sandwiched between Qmin and Qmax in the final read out.

Figure 1D:
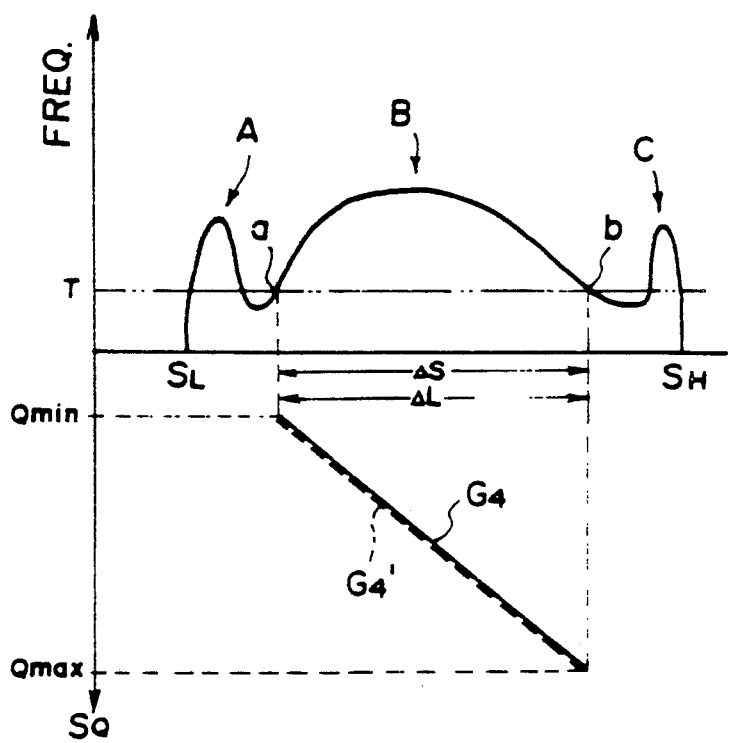

FIG. 1D shows the case where the image information range corresponding to the projecting portion B is wider than in FIG. 1C. and $\Delta S > \Delta SSH$. In this case, the latitude $\Delta L$ of a reproduced visible image is determined so that $$\Delta L = \Delta S > \Delta S_{SH}$$

FIGS. 2A, 2B, 2C and 2D are graphs showing function forms of the latitudes $\Delta L$ of reproduced visible images with respect to the latitudes $\Delta S$ of the image information ranges necessary for reproducing the visible images.

Figure 2A:
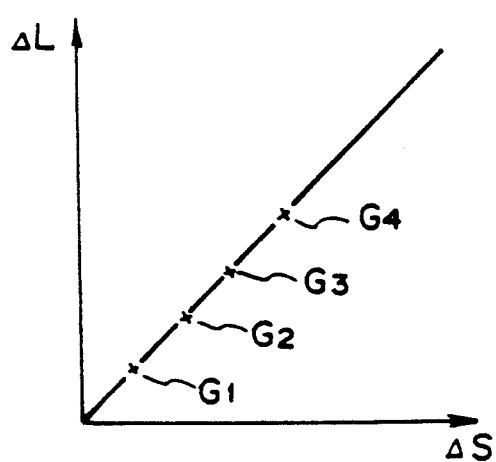
FIGS. 2A, 2B, 2C and 2D are graphs showing function forms of latitudes ΔL of reproduced visible images with respect to latitudes ΔS of image information ranges shown in FIGS. 1A, 1B, 1C and 1D.

FIG. 2A shows the function form in the conventional techniques, wherein $\Delta L = \Delta S$. Points G1, G2, G3 and G4 correspond to the straight lines G1, G2, G3 and G4 shown in FIGS. 1A through 1D.

Figure 2B:
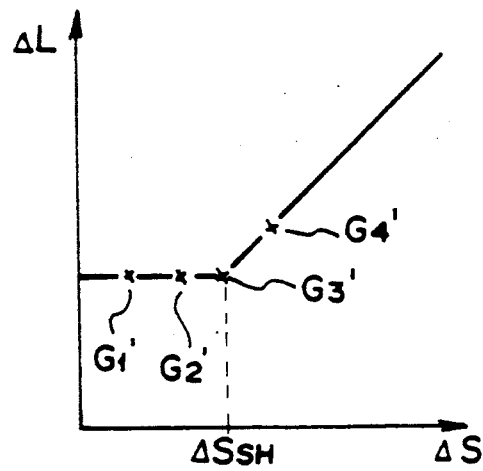

The function form shown in FIG. 2B corresponds to the aforesaid embodiment of the present invention described above with reference to FIGS. 1A through 1D. Points G1', G2', G3' and G4' correspond to the straight lines G1', G2', G3' and G4' shown in FIGS. 1A through 1D.

With reference to FIG. 2B, as long as the latitude ΔS of the image information range necessary for reproducing a visible image satisfies the relationship expressed as ΔS≧ΔSSH, the latitude ΔL of the reproduced visible image is the same as in FIG. 2A. However, when ΔS<ΔSSH, the latitude ΔL of the reproduced visible image is a constant. Specifically, when the latitude ΔS is narrow, the read-out condition for the final read out is adjusted so that, in the course of reproducing a visible image, the image information in the latitude ΔS is distributed over only part of the density range sandwiched between the minimum density Dmin and the maximum density Dmax on a recording sheet. Accordingly, it is possible to prevent the reproduced visible image from having very high contrast.

Figure 2C:
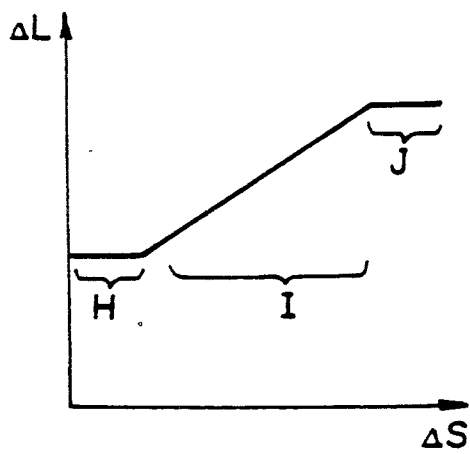
Figure 2D:
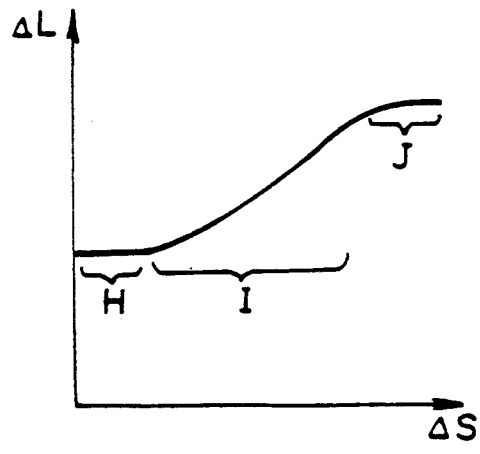

FIGS. 2C and 2D shows different embodiments of the present invention.

With reference to FIG. 2C, the latitude ΔL is kept constant when the latitude ΔS falls within a small range H and a large range J. When the latitude ΔS falls within an intermediate range I, the latitude ΔL is widened along a straight line having a gradient smaller than in FIG. 2B. Because the latitude ΔL is kept constant when the latitude ΔS falls within the large range J, it is possible to prevent the problem that the latitude ΔL becomes too wide and the density resolution of a reproduced visible image deteriorates to an extent rendering the visible image unsuitable for viewing purposes. Also, when the latitude ΔS falls within the intermediate range I, the latitude ΔL is widened more gradually than in the embodiment in FIG. 2B wherein ΔL =ΔS when ΔS≧ΔSSH. Therefore, regardless of whether the latitude ΔS of the image signal is or is not wide, it is possible to obtain a reproduced visible image giving a natural impressing as in cases where the X-ray images recorded on conventional X-ray films are observed directly.

In the embodiment shown in FIG. 2D, when the latitude ΔS falls within an intermediate range I, the latitude ΔL is widened along a curve. When such a function form of a higher order is employed, a reproduced visible image can be adapted more finely to the viewing purposes.

In order to determine the latitude ΔL in the embodiment shown in FIG. 2B, the threshold value ΔSSH is stored in the operating section 18 shown in FIG. 3. The operating section 18 then creates the histogram from the preliminary read-out image signal SP received from the A/D converter 17, and determines the latitude ΔS of the image signal from the histogram. Thereafter, the operating section compares the latitude ΔS with the threshold value ΔSSH and judges whether the former is or is not larger than the latter.

Alternatively, the function form shown in FIG. 2B, 2C or 2D may be stored in the operating section 18.

A single function form of the latitude ΔL may be employed for the preliminary read-out image signal SP detected from every type of the radiation image. Alternatively, different appropriate function forms may be employed for different types of objects (for example, the chest and the abdomen of the human body).

After the latitude ΔL has been determined in the manner described above, the read-out condition for the final read out, such as the value of voltage applied to the photomultiplier 11' or the amplification degree of the amplifier 16', is adjusted by the operating section 18 in accordance with the latitude ΔL.

A stimulable phosphor sheet 1' from which the preliminary read out has been finished is placed at a determined position in a final read-out section 30', and scanned with a light beam 5' having a higher level of energy than that of the light beam 5 used in the preliminary read-out. In this manner, an image signal SQ is detected by using the read-out condition adjusted in the manner described above. The configuration of the final read-out section 30' is nearly the same as that of the preliminary read-out section 30, and therefore elements corresponding to those constituting the preliminary read-out section 30 are numbered with corresponding primed reference numerals in FIG. 3.

The image signal SQ obtained from digitization in an A/D converter 17' is fed into an operating section 18', which carries out appropriate image processing of the image signal SQ. The image signal obtained from image processing is fed into a reproducing apparatus 20, which reproduces a visible image by use of the processed image signal.

In the embodiment shown in FIG. 3, the preliminary read-out section 30 and the final read-out section 30' are separate from each other. Alternatively, because the configurations of the preliminary read-out section 30 and the final read-out section 30' are approximately identical with each other, a single read-out section may be utilized for both the preliminary read-out and the final read-out. In this case, after the preliminary read-out is carried out by scanning the stimulable phosphor sheet 1 with a light beam having a low level of energy, the stimulable phosphor sheet 1 may be moved back to a position at which image read-out is started. Thereafter, the final read-out may be carried out by scanning the stimulable phosphor sheet 1 with a light beam having a high level of energy.

In cases where a single read-out section is utilized for both the preliminary read-out and the final read-out, it is necessary to change over the intensity of the light beam between the preliminary read-out step and the final read-out step. For this purpose, the intensity of the light beam produced by a laser beam source or the like may be changed, or the intensity of the light beam may be changed by moving an ND filter or the like into and out of the optical path of the light beam. Alternatively, the diameter of the light beam may be changed, or the speed of main scanning or sub-scanning may be changed.

Also, in the aforesaid embodiments, the read-out condition for the final read out is adjusted based on the latitude ΔL determined by the operating section 18. Alternatively, a predetermined read-out condition may be used in the final read out regardless of the latitude ΔS of the image signal range, and the latitude ΔL determined by the operating section 18 may be fed into the operating section 18' as indicated by the broken line in FIG. 3. Thereafter, based on the latitude ΔL, an image processing condition to be used in image processing of the image signal SQ detected during the final read out, which image processing is carried out in the operating section 18', may be adjusted. Also, both the read-out condition and the image processing condition may be adjusted based on the latitude ΔL.

Furthermore, the aforesaid embodiments are applied to cases where the preliminary read out is carried out. However, the method of adjusting a read-out condition and/or an image processing condition for a radiation image in accordance with the present invention is also applicable to cases where no preliminary read out is carried out, and only an image read-out step corresponding to the aforesaid final read out is carried out. In this case, an image signal is detected by using a predetermined read-out condition without taking the latitude $\Delta L$ into consideration. The latitude $\Delta L$ is then determined in the manner described above based on the image signal, and is taken into consideration when image processing of the image signal is carried out.

The present invention is not limited to the aforesaid embodiments wherein a stimulable phosphor sheet is used, and is also applicable to, for example, a system wherein a conventional X-ray film is used.

Figure 4:
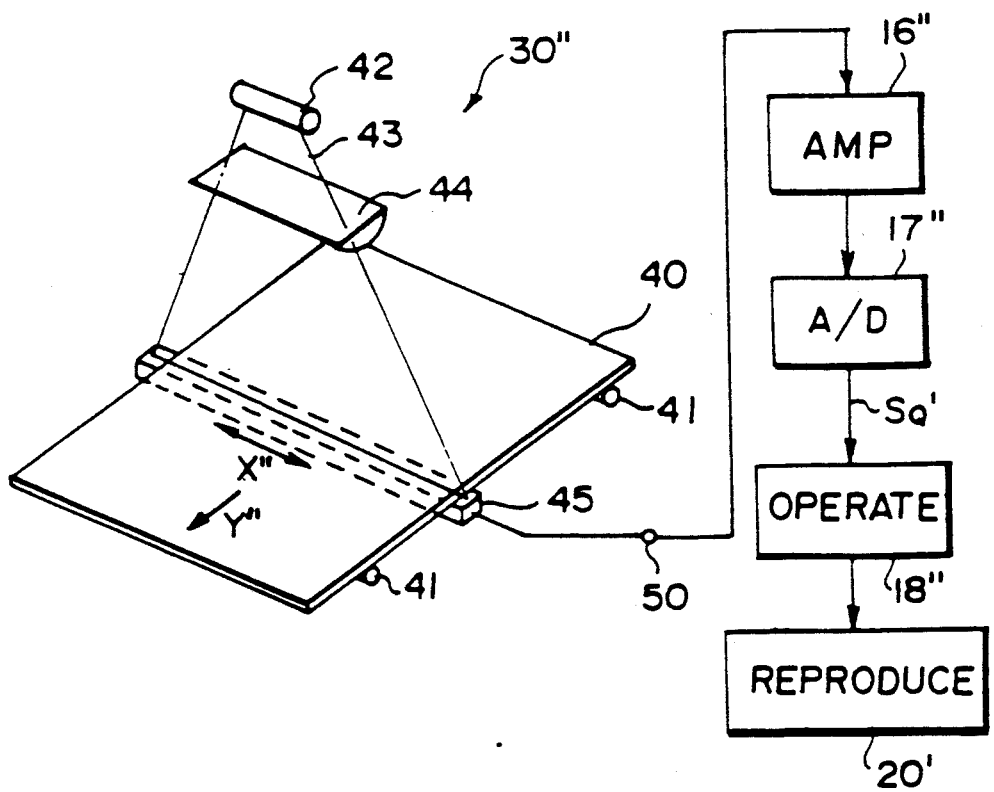
FIG. 4 is a perspective view showing an example of the X-ray image read-out and reproducing system for reading out an X-ray image recorded on an X-ray film and reproducing a visible image.

With reference to FIG. 4, an X-ray film 40 on which an X-ray image has been recorded is placed at a predetermined position in a read-out section 30", and is conveyed in the direction indicated by the arrow Y" by a film conveyance means 41.

Reading light 43 produced by an elongated light source 42 extending in one direction is converged by a cylindrical lens 44, and is linearly irradiated onto the X-ray film 40 in the direction indicated by the arrow X", which direction is approximately normal to the direction indicated by the arrow Y". A MOS sensor 45 is positioned below the X-ray film 40 so that the MOS sensor 45 can receive the reading light 43 which has passed through the X-ray film 40 and intensity of which has been modulated in accordance with the X-ray image recorded on the X-ray film 40. The MOS sensor 45 comprises a plurality of solid state photoelectric conversion devices which are arrayed linearly at intervals equal to those of picture elements of the X-ray image along the direction indicated by the arrow X". As long as the X-ray film 40 is conveyed in the direction indicated by the arrow Y" while being exposed to the reading light 43, the MOS sensor 45 detects the reading light, which has passed through the X-ray film 40, at predetermined time intervals corresponding to the intervals of the picture elements of the X-ray image along the direction indicated by the arrow Y".

Figure 5:
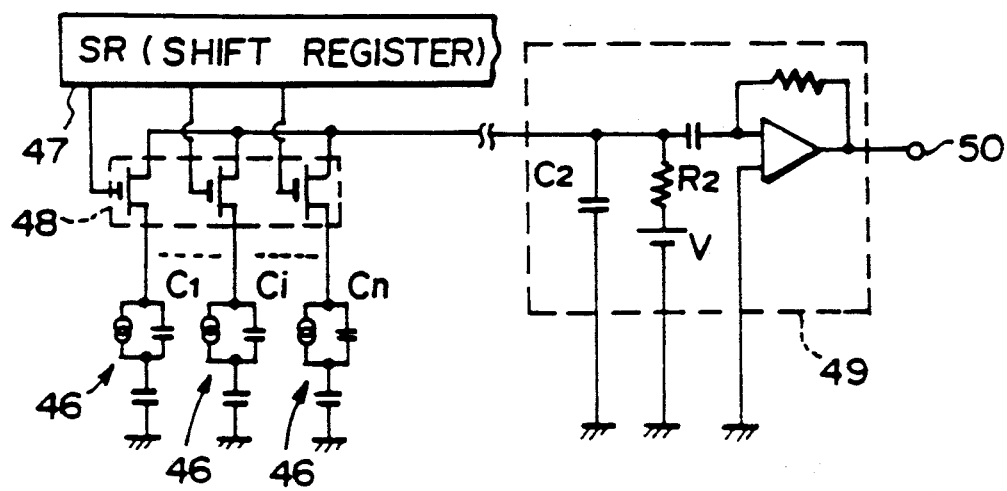
FIG. 5 is a circuit diagram showing an equivalent circuit of a MOS sensor.

FIG. 5 shows an equivalent circuit of the MOS sensor 45.

With reference to FIG. 5 photocarriers generated when the reading light 43 impinges upon the solid state photoelectric conversion devices 46, 46, . . . are accumulated in capacitors Ci (i=1, 2, . . . , n) of the solid state photoelectric conversion devices 46, 46, . . . The number of photocarriers accumulated in the capacitors Ci is detected by sequentially switching a switch section 48 controlled by a shift register 47, and a time-serial image signal is obtained thereby. The image signal is then amplified by a pre-amplifier 49 and is fed out from an output terminal 50 of the pre-amplifier 49.

The analog image signal fed out is amplified by an amplifier 16", and the amplified signal is converted by an A/D converter 17" into a digital image signal SQ'. The digital image signal SQ' is fed into an operating section 18". The operating section 18" adjusts an image processing condition based on the image signal SQ' in the same manner as described above, and then carries out appropriate image processing of the image signal SQ' by using the adjusted image processing condition. The processed image signal is fed into a reproducing apparatus 20', which reproduces a visible image from the processed image signal. In this embodiment, the MOS sensor 45 may be replaced by a charge coupled device (CCD) or a charge priming device (CPD). Also, the X-ray image may be read out from the X-ray film 40 by two-dimensionally scanning the X-ray film 40 with a light beam in the same manner as described above for image read-out from the stimulable phosphor sheet. Furthermore, instead of detecting light which has passed through the X ray film 40, light reflected by the X-ray film 40 may be detected.

The method of adjusting a read-out condition and/or an image processing condition for a radiation image in accordance with the present invention is applicable to various types of radiation image read-out and reproducing systems wherein an image signal is obtained by reading out a radiation image from a recording medium, on which the radiation image of an object has been recorded, image processing of the image signal is carried out by using an image processing condition, and a visible image is reproduced from the processed image signal.

I claim:

1. In a radiation image read-out and reproducing system for scanning a stimulable phosphor sheet, on which a radiation image of an object has been stored, with a light beam which causes the stimulable phosphor sheet to emit light in proportion to an amount of energy stored during exposure to radiation, photoelectrically detecting the emitted light by using a read-out condition, thereby to obtain an image signal, carrying out image processing of the image signal by using an image processing condition, and reproducing a visible image from the processed image signal, a method of adjusting a read-out condition and/or an image processing condition for a radiation image, which comprises the steps of:

i) carrying out preliminary read out for approximately ascertaining the radiation image, which is stored on the stimulable phosphor sheet, by scanning the stimulable phosphor sheet with a light beam having a lower level of energy than the level of energy of the light beam used in final read out prior to carrying out the final read out for obtaining said image signal by detecting said emitted light, ii) creating a histogram of a preliminary read-out image signal obtained by the preliminary read out, iii) determining an image information range, which is necessary for reproducing said visible image, from said histogram, and iv) adjusting the read-out condition and/or the image processing condition in accordance with a latitude of said image information range so that a latitude of said reproduced visible image is changed so as to widen nonlinearly when the latitude of said image information range widens.

2. A method of adjusting a read-out condition and/or an image processing condition for a radiation image as defined in claim 1 wherein the read-out condition and/or the image processing condition is adjusted so that the latitude of said reproduced visible image is constant when the latitude of said image information range is narrower than a predetermined threshold value, and the latitude of said reproduced visible image is widened linearly when the latitude of said image information range is wider than said predetermined threshold value.

3. A method of adjusting a read-out condition and/or an image processing condition for a radiation image as defined in claim 1 wherein the read-out condition and/or the image processing condition is adjusted so that the latitude of said reproduced visible image is constant when the latitude of said image information range is narrower than a first predetermined threshold value and when the latitude of said image information range is wider than a second predetermined threshold value which is larger than said first predetermined threshold value, and the latitude of said reproduced visible image is widened linearly when the latitude of said image information range falls within the range sandwiched between said first predetermined threshold value and said second predetermined threshold value.

4. A method of adjusting a read-out condition and/or an image processing condition for a radiation image as defined in claim 1 wherein the read-out condition and/or the image processing condition is adjusted so that the latitude of said reproduced visible image is approximately constant when the latitude of said image information range is narrower than a first predetermined threshold value and when the latitude of said image information range is wider than a second predetermined threshold value which is larger than said first predetermined threshold value, and the latitude of said reproduced visible image is widened nonlinearly when the latitude of said image information range falls within the range sandwiched between said first predetermined threshold value and said second predetermined threshold value.

5. In a radiation image read-out and reproducing system for obtaining an image signal by reading out a radiation image from a recording medium, on which the radiation image of an object has been recorded, carrying out image processing of the image signal by using an image processing condition, and reproducing a visible image from the processed image signal,
a method of adjusting an image processing condition for a radiation image, which comprises the steps of:
i) creating a histogram of said image signal,
ii) determining an image information range, which is necessary for reproducing said visible image, from said histogram, and
iii) adjusting the image processing condition in accordance with a latitude of said image information range so that a latitude of said reproduced visible image is changed so as to widen nonlinearly when the latitude of said image information range widens.

6. A method of adjusting an image processing condition for a radiation image as defined in claim 5 wherein the image processing condition is adjusted so that the latitude of said reproduced visible image is constant when the latitude of said image information range is narrower than a predetermined threshold value, and the latitude of said reproduced visible image is widened linearly when the latitude of said image information range is wider than said predetermined threshold value.

7. A method of adjusting an image processing condition for a radiation image as defined in claim 5 wherein the image processing condition is adjusted so that the latitude of said reproduced visible image is constant when the latitude of said image information range is narrower than a first predetermined threshold value and when the latitude of said image information range is wider than a second predetermined threshold value which is larger than said first predetermined threshold value, and the latitude of said reproduced visible image is widened linearly when the latitude of said image information range falls within the range sandwiched between said first predetermined threshold value and said second predetermined threshold value.

8. A method of adjusting an image processing condition for a radiation image as defined in claim 5 wherein the image processing condition is adjusted so that the latitude of said reproduced visible image is approximately constant when the latitude of said image information range is narrower than a first predetermined threshold value and when the latitude of said image information range is wider than a second predetermined threshold value which is larger than said first predetermined threshold value, and the latitude of said reproduced visible image is widened nonlinearly when the latitude of said image information range falls within the range sandwiched between said first predetermined threshold value and said second predetermined threshold value.

9. A method of adjusting an image processing condition for a radiation image as defined in claim 5 wherein said recording medium is a stimulable phosphor sheet on which a radiation image has been stored, and said image signal is obtained by scanning said stimulable phosphor sheet with a light beam, which causes the stimulable phosphor sheet to emit light in proportion to the amount of energy stored during exposure to radiation, as light emission from said stimulable phosphor sheet, and detecting the light emitted by said stimulable phosphor sheet.

* * * * *